(12) United States Patent
Wei et al.

(10) Patent No.: US 7,161,335 B2
(45) Date of Patent: *Jan. 9, 2007

(54) ADAPTIVE BUS VOLTAGE POSITIONING FOR TWO-STAGE VOLTAGE REGULATORS

(75) Inventors: Jia Wei, Blacksburg, VA (US); Ming Xu, Blacksburg, VA (US); Fred C. Lee, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 215 days.

This patent is subject to a terminal disclaimer.

(21) Appl. No.: 10/781,931

(22) Filed: Feb. 20, 2004

(65) Prior Publication Data

US 2005/0184712 A1 Aug. 25, 2005

(51) Int. Cl.
*G05F 1/00* (2006.01)
*G05F 1/573* (2006.01)

(52) U.S. Cl. ..................... 323/266; 323/282

(58) Field of Classification Search ............... 323/282, 323/266; 363/41
See application file for complete search history.

(56) References Cited

U.S. PATENT DOCUMENTS

| | | | | |
|---|---|---|---|---|
| 5,828,204 A * | 10/1998 | Jansen | ............... | 323/266 |
| 5,903,138 A * | 5/1999 | Hwang et al. | ............... | 323/266 |
| 6,278,263 B1 * | 8/2001 | Walters et al. | ............... | 323/272 |
| 6,414,470 B1 * | 7/2002 | Liu et al. | ............... | 323/272 |
| 6,441,591 B1 * | 8/2002 | Nokkonen | ............... | 323/266 |
| 6,806,689 B1 * | 10/2004 | Schuellein et al. | ......... | 323/272 |
| 6,839,252 B1 * | 1/2005 | Tai et al. | ............... | 363/65 |
| 6,850,044 B1 * | 2/2005 | Hansen et al. | ............... | 323/266 |
| 6,903,536 B1 * | 6/2005 | Yang | ............... | 323/266 |
| 6,937,487 B1 * | 8/2005 | Bron | ............... | 363/60 |
| 2005/0001599 A1 * | 1/2005 | Seo | ............... | 323/237 |

OTHER PUBLICATIONS

Paul Kingsepp, Powering carrier-grade systems, Jun. 2001, CompactPCI Systems.*

* cited by examiner

*Primary Examiner*—Karl Easthom
*Assistant Examiner*—Harry R Behm
(74) *Attorney, Agent, or Firm*—Whitham, Curtis, Christofferson & Cook, PC

(57) ABSTRACT

Alteration of voltage input to a voltage regulator output stage from a $V_{bus}$ regulator stage in a two-stage voltage regulator provides optimal $V_{bus}$ voltage placement for a wide range of current loads to increase voltage regulator efficiency and is particularly suited to CPUs having power-saving sleep modes of operation. An optimal voltage is selected or developed in response to information concerning operational mode or current consumption of the powered device. As a perfecting feature of one embodiment of the invention in which a discrete $V_{bus}$ voltage is selected based on operational mode, the selected voltage is adjusted to further optimize the matching of the $V_{bus}$ voltage placement to the load and provides a continuous range of voltages. In a second embodiment the entire $V_{bus}$ positioning function is performed in response to current load information. A feed-forward arrangement is provided to avoid transient spikes as the $V_{bus}$ voltage placement is altered.

20 Claims, 16 Drawing Sheets

ADAPTIVE BUS VOLTAGE POSITIONING FOR TWO-STAGE VOLTAGE REGULATORS

BACKGROUND OF THE INVENTION

1. Field of the Invention

The present invention generally relates to high efficiency electrical power supply voltage regulators and, more particularly to improving the efficiency of voltage regulators which must supply power to highly variable loads with extremely wide variation in current requirements.

2. Description of the Prior Art

All electrically operated devices require electrical power and are designed to operate on the type of power which can be provided from the source which is most convenient in view of the intended function. Devices which are generally operated in a fixed location, such as household appliances and other devices having moderate power requirements, are generally designed and constructed to operate on efficiently transmitted alternating current power of a standard voltage while larger power requirements may require multi-phase alternating current power at higher voltages. On the other hand, devices which must be portable for their intended use generally are designed and constructed to be operated on direct current from batteries at a nominally constant voltage.

However, the amount of power which may be stored in and recovered from batteries is necessarily limited, particularly where the size or weight of the batteries must be limited for convenience of the use of the device. Moreover, as a battery is discharged, the voltage obtainable therefrom necessarily varies and decreases as the battery becomes more discharged. The internal resistance of batteries, while low in modern designs, is not negligible and also causes voltage reduction with increased load. While some devices operating on battery power may be tolerant of voltage variation, modern electronic devices using high density integrated circuits, such as may be used in so-called laptop and palm-top computers and personal digital assistants (PDAs) which have recently become popular, increasingly require extremely stable and substantially constant voltage within a tolerance of a few tenths or hundredths of a volt and thus require high quality voltage regulation.

Unfortunately, circuits capable of regulating voltage, even with relatively wide tolerances, necessarily consume a finite amount of power since the output voltage must necessarily be reduced from a higher voltage by causing a-voltage drop across some components in the voltage regulator while a current is being supplied. The power consumed is thus, at a minimum, the product of the voltage drop and the current for analog regulators although such power consumption may be reduced somewhat by switching regulators as will be discussed below. If the load is relatively constant, the voltage regulator can be carefully designed to operate with a very low voltage drop and thus may be relatively efficient. However, transient changes in load current may cause corresponding fluctuations in the regulator output voltage unless the voltage is adequately filtered, generally requiring a relatively large storage capacitor or voltage regulation from a higher voltage with a correspondingly larger voltage drop so that peak currents can be supplied from the voltage regulator or a combination of both; either of which necessarily requires features which are generally undesirable in a portable device (e.g. the size and weight of filter capacitors and the increased inefficiency of the voltage regulator coupled with increased battery size and weight to compensate for that inefficiency). Further, power consumed by the voltage regulator must be dissipated as heat in the portable device and the minimum size and weight of the regulator is generally increased by both the current which must be delivered and the heat which must be dissipated. Conversely, for a given voltage regulator and filter and/or battery size and weight, the efficiency of any voltage regulator is necessarily reduced in accordance with the magnitude of changes and frequency of transients in load current it must accommodate and the accuracy of voltage regulation which must be provided.

These interrelated problems are particularly acute in regard to portable data processing devices such as laptop computers and similar device alluded to above. The duration of operation for each use cycle is generally a significant fraction of an hour, at a minimum, while digital processing, memory and logic circuits required therein require extremely close tolerances of voltage regulation, size and weight constraints are severe for commercially competitive designs and, most importantly, the changes in load current are particularly large, especially in modern processor designs with sophisticated power saving circuits. More specifically, modern processors are generally designed to enter one of a plurality of "sleep states" relatively quickly when an operation is completed and no new data or command is entered. Thus, while the peak power requirements of the processor and associated circuitry may be, for example, 50 Watts, the average power consumed is a small fraction of that requirement, for example, an average power consumption of 5 Watts or less. The duty cycle of the peak power consumption may be substantially less than ten percent. Much the same scenario is presented by the display which generally consumes far more power than the processor but which may be blanked after a relatively short period during which the display is unchanged.

Thus, in general and on average, the display represents about 33% of the power load, the processor represents about 10% of the power load while other associated devices such as a hard disk storage, clock, memory, modem, network interfaces and the like, some of which may be intermittent loads, represent slightly less than half of the power load. Thus, at the present state of the art, the voltage regulator may consume an amount of power comparable to that required, on average, by the processor and is thus a significant factor in battery life and a significant limitation on the period of usability of the laptop computer or other portable digital device per battery charge while the efficiency of the voltage regulator is generally comparatively lower than for many other devices in view of the close regulation required and the wide variation in loads which must be accommodated.

SUMMARY OF THE INVENTION

It is therefore an object of the present invention to provide a voltage regulator of small dimensions and weight and having increased efficiency while capable of accommodating wide variation in current load and high frequency load transients.

It is another object of the invention to provide a two-stage voltage regulator wherein the second stage may be of arbitrary design and constitution while the first stage substantially improves overall efficiency of the voltage regulator.

In order to accomplish these and other objects of the invention, a two-stage voltage regulator is provided in which the output voltage of the first stage is dynamically positioned to a substantially optimum voltage for the instantaneous load or processor state. Transient response is improved by a feed-forward arrangement. As a perfecting feature of the invention, the first stage voltage output is adaptively adjustable based on actual voltage regulator current output. Specifically, an electrical device including a voltage regulator and a voltage regulator are provided wherein the voltage regulator includes a voltage regulator stage having an input for receiving an input voltage, and a $V_{bus}$ supply voltage regulator stage having an input for receiving information corresponding to an operational mode of said electrical device and supplying a selected voltage corresponding to said operational mode as said input voltage to said voltage regulator stage.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
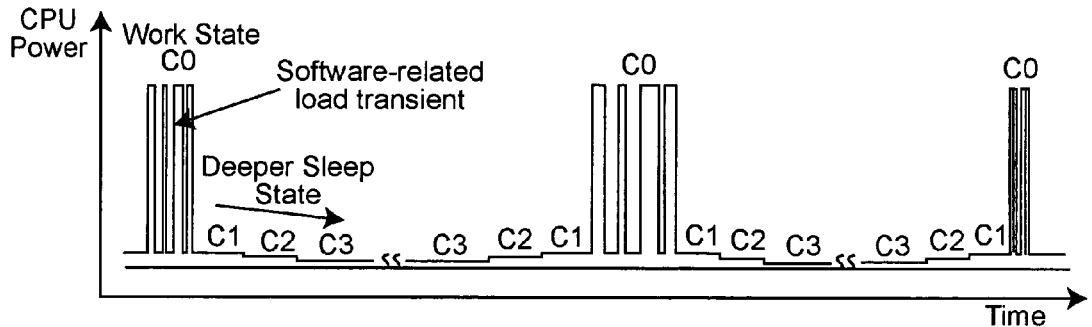
FIG. 1 is a schematic graphical depiction of an exemplary power consumption pattern in a CPU of a laptop computer, FIG. 2 graphically illustrates exemplary voltage regulator efficiency for different loads for different intermediate bus voltsages.

Referring now to the drawings, and more particularly to FIG. 1, there is shown a graphical representation of an exemplary power consumption pattern for a digital processor through several cycles which each include a plurality of operating states C0, C1, C2 and C3. Operating state C0 is the working state in which the processor is performing data processing operations at the full clock rate. This working state is generally characterized by a plurality of peaks or high plateaus of processing operations interspersed with relatively lower levels of processing and power consumption as may be caused by the software controlling the operations of the processor. The working state periods are generally fairly brief and of variable duration (also dependent upon software) and are usually widely separated (generally due to at least the time required for a user to assimilate the information content of a display of the results of operations during a C0 working period and to provide a further input, requiring further C0 processing). Thus the duty cycle of the C0 working period, while user-dependent, is generally much less than 10%.

In the possibly extended intervals between C0 working periods the processor enters progressively deeper "sleep states" C1, C2 and/or C3 generally depending on the elapsed time prior to another user input or programmed operation; during each of which, progressively less power is consumed by the processor. Each of the "sleep states" generally requires significantly less than 10% of the power required for the C0 state since the average processor power consumed is generally about 10% or less of the peak power requirements. Therefore, it is readily seen that the ratio of peak power requirements and minimum power requirements of a processor substantially exceeds 10:1 and the processor is in one of the low power sleep state for the predominant portion of the time, often exceeding 90%.

Figure 2:
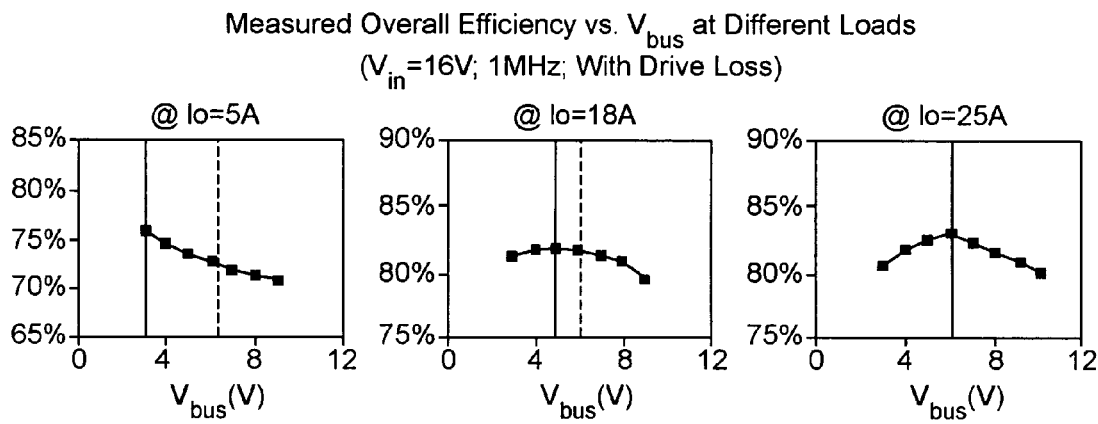

Referring now to FIG. 2 the overall efficiency of a two-stage voltage regulator of a design suitable for delivering a high current over a range of input voltages is illustrated for different current loads Io. (FIG. 2 includes drive losses associated with driving of the switching transistors such as Q11, Q12, Q1, Q2 in the regulator stages and switching transient suppression. However, since the drive losses are relatively small and do not vary significantly, the trends in the data are the same whether or not drive losses are considered and are not important to an understanding of the basic principles of the invention. Therefore, drive losses will not be further discussed.) For a heavy current load of 25 A and a more moderate load of 18 A the measured efficiency shows a definite peak but at different voltages while for a light load of 5 A, the function is substantially monotonic in the range of interest (a peak would be expected at a lower voltage than is illustrated or practical to utilize in power supplies which must also be able to supply high currents) with higher efficiency being achieved at lower $V_{bus}$ voltage although lower (e.g. 76%) than for the higher current load graphs (e.g. 83%). The $V_{bus}$ voltage yielding maximum efficiency for each current load is depicted by a solid line in each graph with the optimum $V_{bus}$ voltage for a 25 A current load (about 6V) is replicated by a dashed line in the graphs for lower current loads for convenience of comparison. Thus, it is seen that a voltage regulator designed to deliver relatively high current loads tends to have less than optimal efficiency as current loads increase but even greater and highly significant loss of efficiency as current loads decrease, particularly if the voltage, $V_{bus}$, is held constant (e.g. as indicated by the dashed lines). Therefore, the power requirement pattern for a laptop computer or the like discussed above in regard to FIG. 1 presents several aspects (e.g. high peak current requirements and long periods and high percentage of time in very low power sleep states) which severely compromise overall voltage regulator efficiency. Nevertheless, as observed by the inventors, it is seen that for heavier current loads, a higher $V_{bus}$ voltage yields greater voltage regulator efficiency and for lighter current loads, a lower $V_{bus}$ voltage yields greater voltage regulator efficiency and that $V_{bus}$ can be optimized for different, widely separated load currents for a voltage regulator of substantially arbitrary design.

While this observation underlies a basic principle of the present invention, suitable arrangements for altering $V_{bus}$ to a substantially optimum value based on load is not trivial in practice. Providing switching of regulator input voltages require multiple, separate supplies which would each have significant weight and size. Further, some $V_{bus}$ voltage sources would not be under load at any given time and the voltage delivered is almost necessarily load-dependent and switching from a loaded voltage source to an unloaded voltage source will necessarily involve complications of timing and generation of significant transients in the absence of circuits of substantial size and weight to suppress such transients which, in turn, are likely to compromise overall regulator efficiency in addition to unavoidable loss of efficiency due to the losses and leakage in each of the $V_{bus}$ supplies while unused.

Further, as will be discussed in greater detail below, the inventors have found that an abrupt change in $V_{bus}$ causes an anomaly in operation of a voltage regulator receiving $V_{bus}$ which seriously compromises accuracy of voltage regulation. A solution to this anomaly has been found by the inventors and is discussed in detail below.

As alluded to above, a two-stage configuration is preferred for practice of the invention. This preference is due, in part, to the desirability of providing a generalized arrangement for alteration of the $V_{bus}$ voltage as a first stage so that the invention can be retrofitted to existing voltage regulators to improve overall efficiency, regardless of voltage regulator design or otherwise implemented in existing designs to reduce space, weight and heat dissipation requirements. Further and perhaps more importantly, a two-stage regulator can produce higher efficiency for high current loads than the single-stage regulators which are currently most frequently employed.

It should be understood in connection with the following discussion that switching voltage regulator designs are generally considered to be most efficient and can generally be implemented with relatively few components. Such designs generally employ a switching transistor in series with the input voltage to supply current as needed with a series inductor to smooth the output voltage input to a filter capacitor with a further transistor at the inductor input to reduce switching transients and provide a source of current for the inductor when the series transistor is switched off. In its simplest form, such a circuit is known as a buck converter (since it converts a higher DC voltage to a lower DC voltage and the inductor "bucks" the excess voltage during series transistor conduction) and many variations on this type of circuit are known to those skilled in the art, as are suitable switching control arrangements to obtain a desired voltage. In general, also, when such converters are employed in a two-stage (or multi-stage) voltage regulator, the first stage in generally operated or switched at a substantially lower frequency than the final stage particularly to minimize output voltage ripple while minimizing the size and weight of filter capacitor(s). While such types of switching converters are assumed in the following discussion, it is to be understood that the invention is applicable to any type of regulator circuit(s) but a switching type of converter is preferred as the first stage of the overall voltage regulator circuit in accordance with the invention in which a two-stage arrangement is also preferred.

Figure 3A:
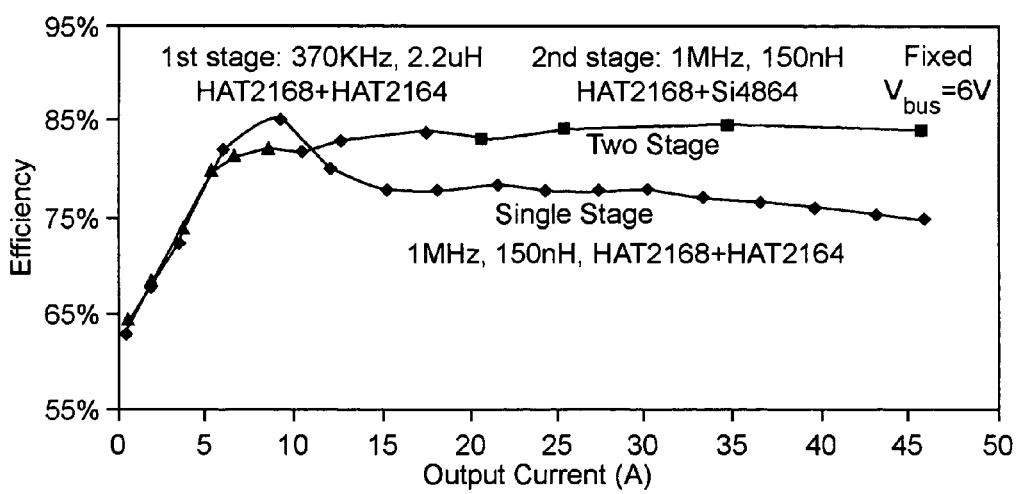
FIGS. 3A and 3B illustrate a comparison of efficiencies of one-stage and two-stage voltage regulators as a function of load for a fixed input voltage and a variable input voltage, respectively.

The relative efficiency of one-stage and two-stage voltage regulators is graphically illustrated in FIG. 3A. The first stage is operated at a switching frequency of 370 KHz using a 2.2 pH series inductor while the second stage of a two stage regulator or single stage regulator is operated at 1 MHz with a 150 nH series inductor. In other words, FIG. 3 illustrates the difference in performance attributable to the addition of a first stage. It will be observed that at current loads below about 4A, the efficiency is substantially identical with the single stage regulator having slightly increased efficiency from about 4A to 8A load. At higher current loads to 45A, the two-stage regulator is significantly more efficient with comparative efficiency increasing for the two-stage regulator with increasing current load (e.g. substantially constant efficiency near 85% while the efficiency of the single-stage regulator only slightly exceeds 75% and declines slightly with increasing load). It should be appreciated that the slight advantage in efficiency of the single-stage regulator at loads of about 5 A (the average current load for a processor, as discussed above) together with the low duty cycle or percentage of time the processor requires much higher current loads as well as the slight simplification and reduction of parts count may account for the current common usage of single-stage voltage regulators in laptop computers notwithstanding the significantly lower efficiency at higher current loads (where the regulator losses are nearly doubled) and the substantially identical performance at current loads below 4A characteristic of most current processor sleep states and which must be the case to cause the average load to fall to 5A or less. This rationale also neglects consideration of the fact the $V_{bus}$ will be transiently altered in single-stage regulators upon switching to or from high current load periods; further decreasing efficiency by reducing $V_{bus}$ during the early portions of high current load and increasing $V_{bus}$ during early portions of low current load.

Figure 3B:
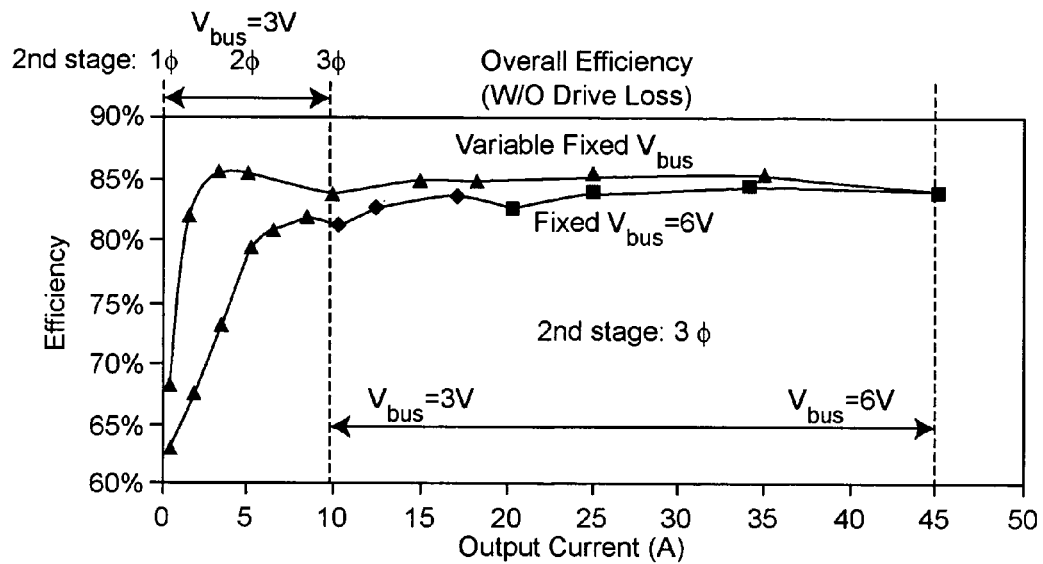

FIG. 3B illustrates the improvement in voltage regulator efficiency (here omitting drive losses) of two-stage regulators attributable to use of variable $V_{bus}$ voltage as compared to the same voltage regulator circuit where $V_{bus}$ is fixed. The voltage regulator circuit and $V_{bus}$ (=6V, similar to FIG. 2) are optimized for a current load of 45 A and the efficiency curves illustrated converge at that load. For the variable $V_{bus}$ curve, $V_{bus}$ varies between 3V and 6V over the range shown and a substantial difference in efficiency is evident near and below the bottom end of this range as $V_{bus}$ is reduced from 6V to 3V and somewhat below that range where the first stage is switching at a very low duty cycle and the second stage is operating much in the manner of a single stage converter (which exhibits an efficiency peak in this region) with efficiency enhanced by optimally reduced $V_{bus}$ as well as by reducing the number of phases used to satisfy the required load, as is preferred. Accordingly, a two-stage or multi-stage configuration is considered preferable for practice of the invention but it is to be understood that stages may be combined to a greater or lesser degree without departing from the basic principles of the invention and discrete, identifiable or independent stages are not necessary to the successful practice of the invention in accordance with its basic principles.

Figure 4:
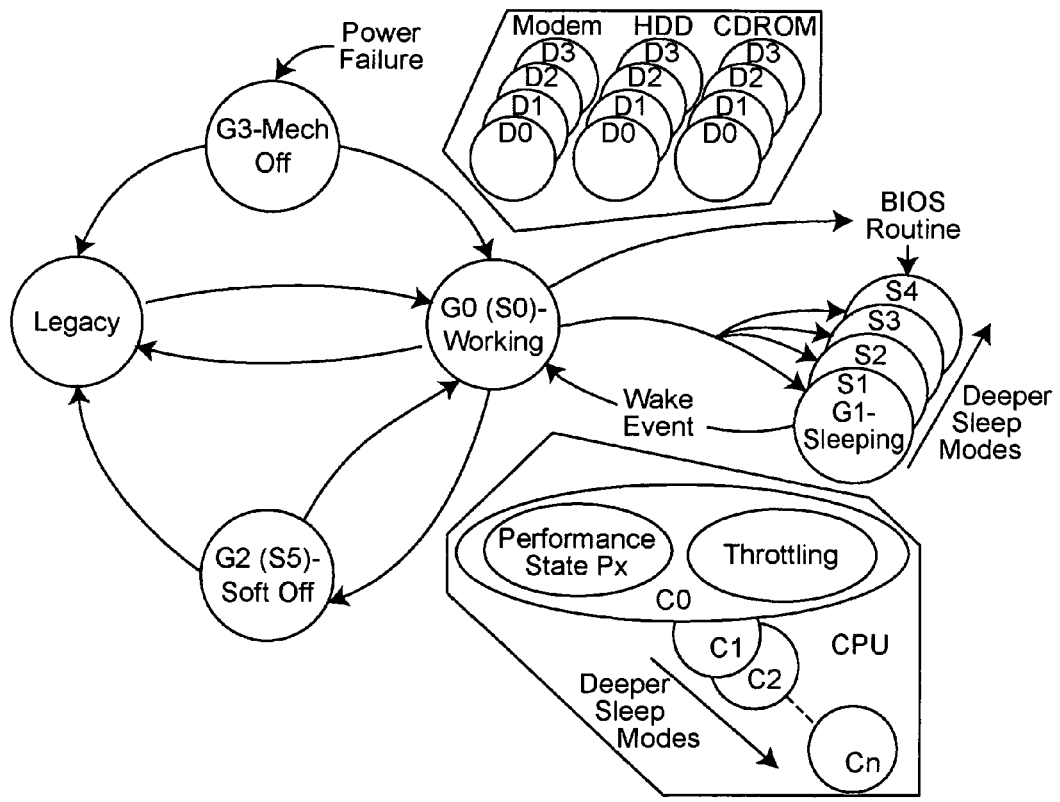
FIG. 4 is a state diagram of possible operating states of an exemplary processor device, FIG. 5 schematically illustrates a generalized embodiment of the invention with simulated and experimental $V_{bus}$ response, FIG. 6 schematically illustrates a generalized embodiment of the invention as in FIG. 5 with simulated $V_{bus}$ and Vo response, FIG. 7 graphically depicts the $V_{bus}$ and vo response of the circuit of FIG. 6 on an expanded time scale, FIG. 8 schematically illustrates addition of feed-forward to the generalized embodiment of FIGS. 5 and 6, FIG. 9 graphically illustrates a comparison of the Vo response of a power supply in accordance with the invention with and without feed-forward.

To convey a more complete understanding of the exemplary power requirement profile of a laptop computer or the like as depicted in FIG. 1, an exemplary state diagram of such a device is depicted in FIG. 4 as generally implemented by an Advanced Configuration and Power Interface (ACPI) developed by a number of commercial CPU manufacturers.

(The prefix "G" is used to connote "global" while the prefix "C" is a specific reference to the CPU state. Prefixes "D", "P" and "S" are specific to other devices in the computer or the like. Numbers refer to particular states of the global system or respective devices with "0" representing the working state and higher numbers representing progressively deeper sleep states with progressively lower power requirements.) This state diagram can possibly be best considered as excursions away from and back to the C0 working state operation of the processor and peripheral devices begins with the G3 mechanically off state (which can be re-entered by a power failure to invoke the G0(S0) state to initiate, for example, a shut-down procedure to avoid data loss or corruption and a similar action in legacy systems). When the system is mechanically switched on, the processor enters the G0 working state to execute the BIOS routine before entering a sleep state G1 which may include any of a plurality of sleep states (here illustrated as S1–S4) which differ in the amount of active processing logic and the like and corresponding amount of required power therefor. A wake event, such as a keyboard entry, returns the processor to the G0 state. An even deeper sleep state is depicted as G2(S5) which is a "soft off" state entered after a given period of another sleep state through the working state so that data loss or corruption or other errors or malfunctions can be avoided when in an extreme low power mode in the processor and legacy systems. The working state C0 and sleep states C1–C3, referred to above in regard to FIG. 1 correspond to combinations of the processor working state, G0(S0), or sleep states, G1(S1–S4) or G2 (S5) and various active or standby states, D0–D3) of peripheral devices or legacy systems as depicted in the insets of FIG. 4.

It should be appreciated that changes of processor state are known in advance by and through the processor, itself. More specifically, C0 is the heavy load performance state although a percentage of maximum performance is generally controlled for battery life and thermal considerations and is generally referred to as "throttling". C1–Cn are light load sleep states. All transitions between the C0–Cn states are possible (e.g. C2–C0, C0 to C1, C2 or C3, etc.) controlled by an Operating System Power Management (OSPM) system running in the CPU. The C1 state is generally indicated through a dedicated processor pin (e.g. the "HLT" pin for Intel 32-bit CPUs). The C2 and C3 states are generally entered by using the P_LVL2 and P_LVL3 command registers or the like, respectively, and similar operations may be provided for other possible sleep states. The Operating System Power Management (OSPM) system controls transitions between different modes and the CPU is aware of a transition generally at least 20 μsec (and often much longer) before the transition is to occur. Moreover, entry into or exit from sleep states C1, C2 or C3 requires some degree of hardware latency. The latency is declared in a Fixed ACPI Description Table (FADT). However, the variations in load during the CO CPU state are not controlled by the OSPM, are totally unpredictable and may occur in the MHz range under processor clock control and thus cannot be followed by a practical voltage regulator. It is also possible for some momentary high current CPU requirements to occur outside the C0 state which also cannot, as a practical matter, be predicted or tracked by a practical voltage regulator.

Thus, in accordance with the invention in its most basic form, it is proposed to provide a higher nominal $V_{bus}$ voltage (e.g. 6 volts) for the C0 state and lower nominal $V_{bus}$ voltage (e.g. 3 volts) for the sleep states; both as indicated through the ACPI in view of the large difference in current requirements between the operating state, C0 and the sleep states, C1–Cn, and the relatively small difference in current requirements of the respective sleep states. It is also preferred in accordance with the basic form and first embodiment of the invention to position $V_{bus}$ to discrete voltage levels in response to the ACPI rather than measured current requirements to more accurately synchronize the change of $V_{bus}$ between discrete voltage levels with the CPU operating state although adaptive adjusting of discrete $V_{bus}$ voltage levels in accordance with a perfecting feature of the first embodiment of the invention or adaptive positioning of $V_{bus}$ over a continuous range of values (e.g. without providing discrete $V_{bus}$ voltage levels as in the second embodiment of the invention) could be provided based on other measured or predicted information including measured load current. It should also be understood that more than two discrete, nominal $V_{bus}$ voltage levels could be provided in the first embodiment of the invention if justified by the power consumption pattern for a particular device (e.g. other than a CPU) to be powered. On the other hand, it is considered by the inventors that, at least for different loads required by a CPU or the like, provision of other voltages through adjustment of either of two nominal (operating state responsive) $V_{bus}$ voltages in a manner which is responsive to measured current, as will be described in detail below as a perfecting feature of the first embodiment, is preferable to providing additional discrete nominal $V_{bus}$ voltage levels and provides additional efficiency, as well.

Figure 5:
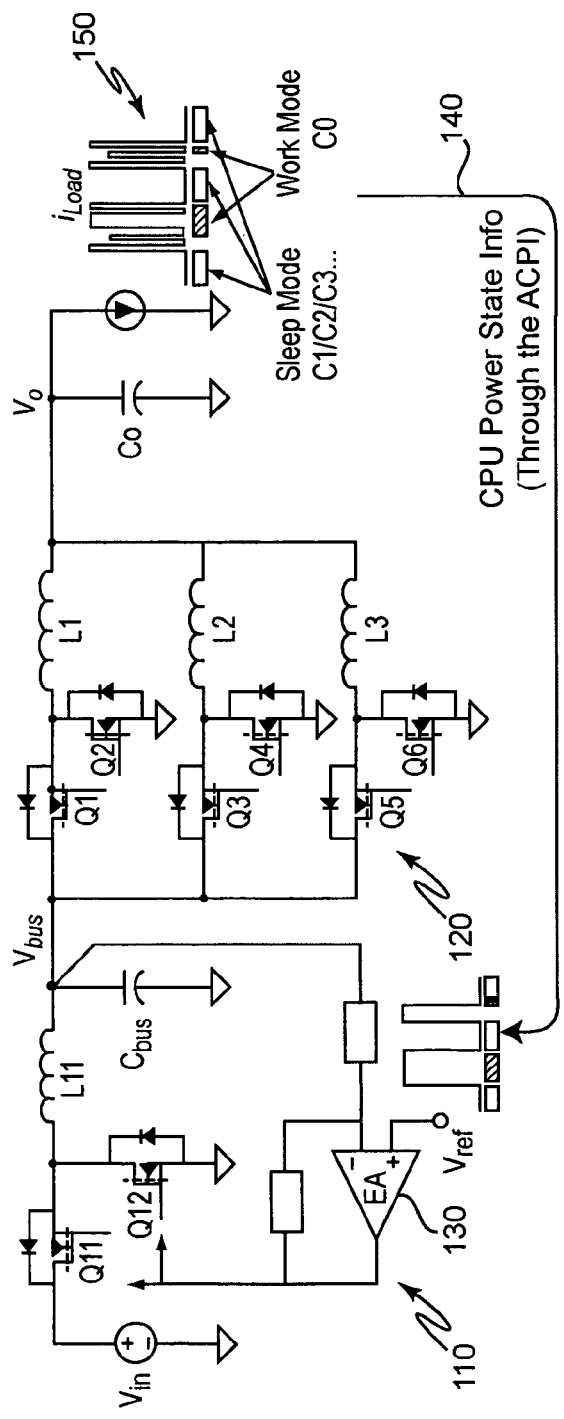
Figure 5:
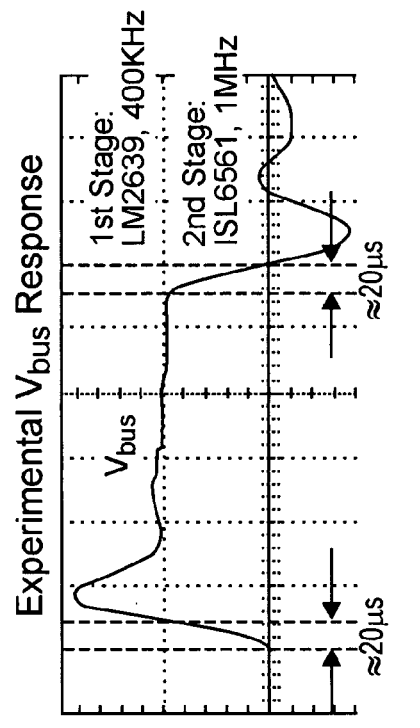
Figure 5:
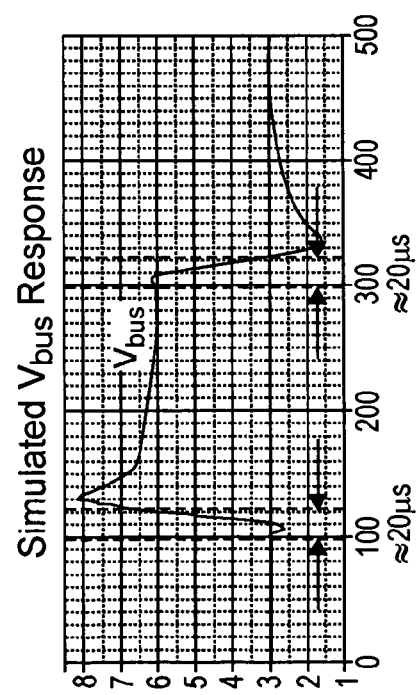

Referring now to FIG. 5, a two-stage voltage regulator in accordance with a preferred form of the basic invention is depicted schematically. The first or $V_{bus}$ supply stage is indicated at 110 and the second stage indicated at 120. The circuits in the first and second stages include, for example, a plurality of switched buck regulator circuits of a known type as discussed above and it is to be understood that the invention is not limited to such circuits but other regulator circuit configurations may be used. The second stage includes a plurality of such circuits connected in parallel and operating at high frequency of different phases, as is also known in the art for high current supply capability. It is considered to be preferable that operation of some of these parallel regulator circuits may be selectively discontinued based on load current requirements, particularly at low current level loads. This illustrated embodiment of the invention differs from the voltage regulator circuit commonly used in laptop computers and the like at the present time by being configured as two stages and having a feedback loop with a voltage comparator 130 in the first stage to control the first stage switching and thus control the $V_{bus}$ voltage and which also provides for a feedback signal 140 from load/CPU 150 which indicates its power state through the ACPI (indicated in FIG. 5 by shading for sleep modes C1–C3 and solid for work mode C0). Thus, the switching times of transistors Q11 and Q12 can be controlled to alter $V_{bus}$ as indicated graphically in FIG. 5 from, for example, 3V to 6V.

Preferably in accordance with this basic embodiment of the invention, there is no repositioning of $V_{bus}$ for the duration of any particular CPU state and the $V_{bus}$ response is rapid and within the period of hardware latency for state transitions alluded to above. Further, since the feedback 140 is through the ACPI which has advance information concerning any change of CPU power state, the change of $V_{bus}$ may be initiated somewhat in advance of the actual CPU state change and thus closely synchronized with changes in the current requirements of the load.

It was noted above, however, that the inventors have discovered an anomaly in the performance of this arrangement which somewhat compromises the accuracy of voltage regulation and may engender transients and possible errors or malfunctions in the CPU. Specifically, the change in $V_{bus}$ voltage must be fairly substantial to optimize $V_{bus}$ for widely differing or varying current loads as discussed above particularly in regard to FIG. 2. When a substantial change in $V_{bus}$ is made, a spike appears in the regulator output voltage Vo as shown at 152 of FIG. 6. This anomaly is basically due to the necessarily or at least highly desirable difference in operating frequency or control bandwidth and, hence, transient response between the first and second stages of the voltage regulator and has not been previously recognized or addressed, particularly since increase of voltage regulator efficiency by positioning of $V_{bus}$ has not previously been provided.

Figure 7:
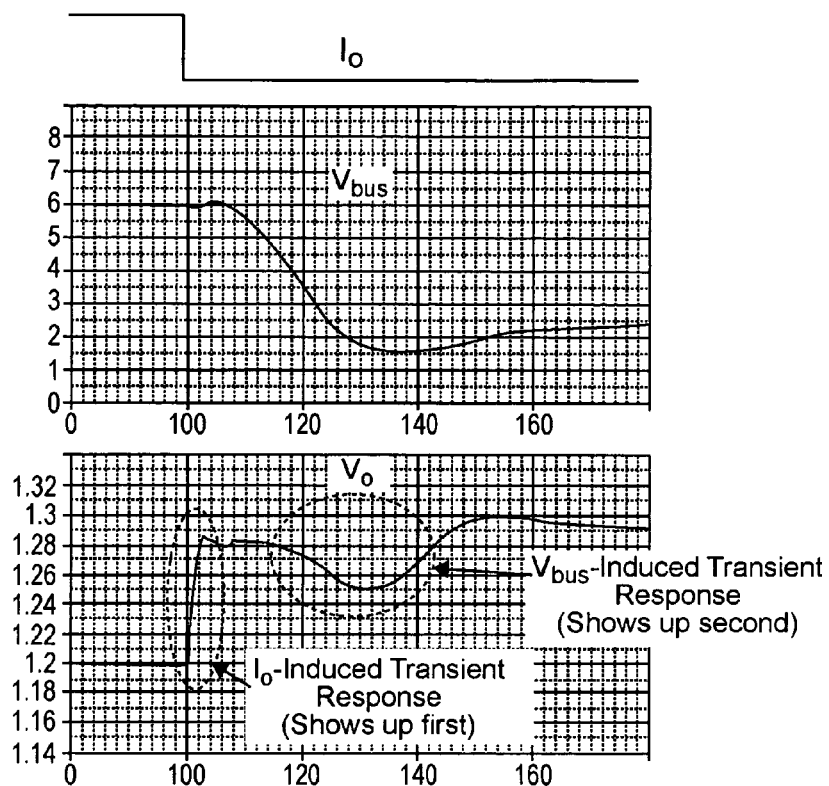

More specifically, as illustrated in FIG. 7, the $V_{bus}$ response of the first stage is dominated by the first stage control bandwidth. The second stage Vo response has two components: the Io induced transient response (e.g. the output impedance induced voltage change when the load increases or decreases) and the $V_{bus}$-induced transient response. Essentially, the Io induced transient response appears first in the second stage prior to the change in $V_{bus}$. The change in $V_{bus}$ then causes a transient but significant change in Vo following the Io induced transient response as the switching of transistors Q1–Q6 is altered during the $V_{bus}$ change.

Figure 6:
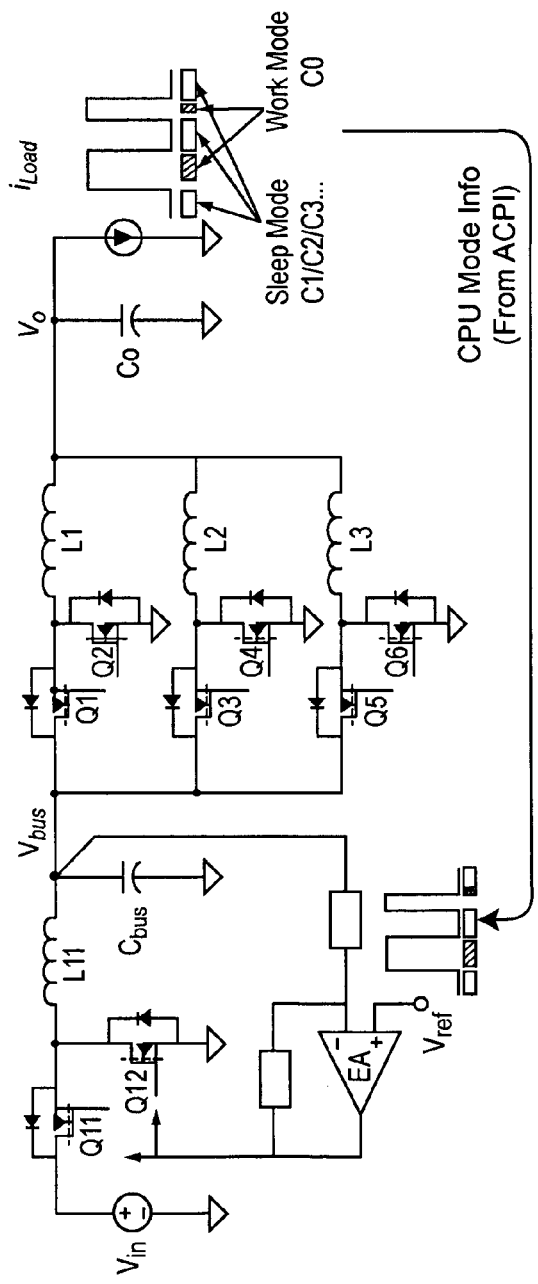
Figure 6:
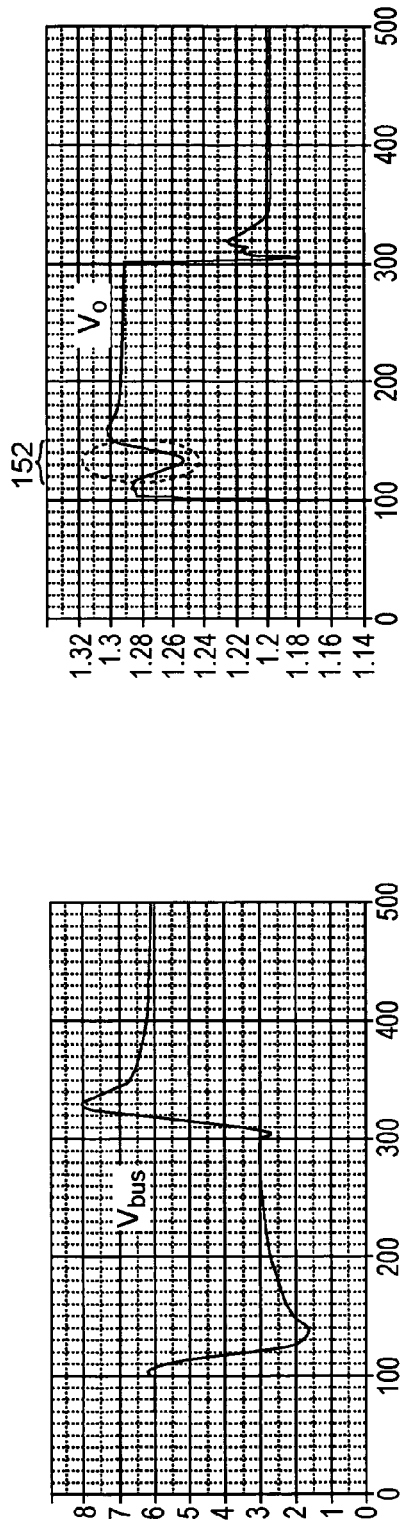
Figure 8:
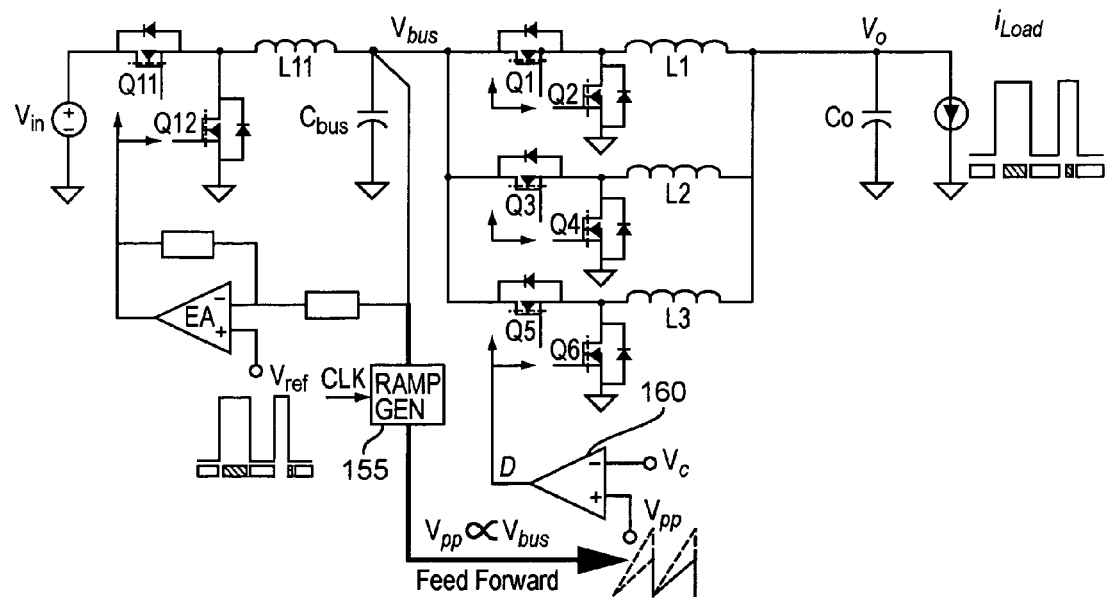
Figure 9:
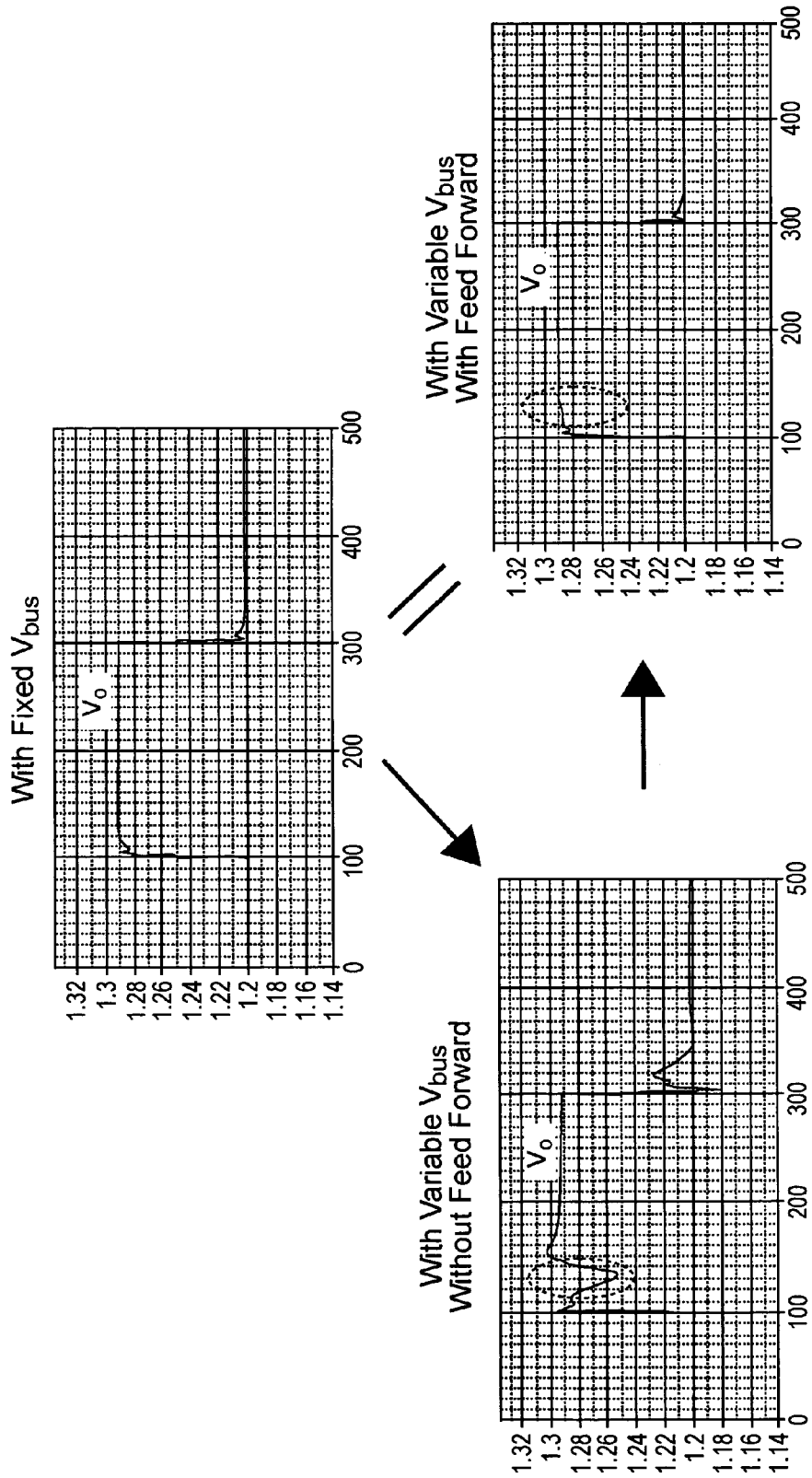

A preferred solution to this anomaly is illustrated in FIG. 8 which is similar to the circuit diagram of FIG. 5 or 6 except for the additional inclusion of a feed-forward connection. The feed forward connection preferably includes, for example, a ramp generator receiving $V_{bus}$ as an input and periodically reset to produce a ramp function having a fixed frequency controlled by an independent or otherwise available clock. Therefore the peak voltage of the ramp, Vpp, is proportional to $V_{bus}$ and $V_{bus}$ controls the ramp slope. When this ramp voltage is provided to the negative input of a voltage comparator having a constant voltage Vc supplied to a positive input thereto, the output of the voltage comparator will change after a period D for each ramp such that $D \times V_{bus}$=Constant. Thus, D is inversely proportional to $V_{bus}$. This period is applied to adjust the switching timing of Q1–Q6 (or Qn) in the second stage circuits to alter their switching periods to compensate for the transient change in $V_{bus}$ concurrently with the occurrence of that change. Therefore Vo is made immune to $V_{bus}$ variation. The efficacy of this solution is illustrated in FIG. 9. Accordingly, the arrangement of FIG. 8 is considered to be preferred for the first embodiment of the invention and it is readily seen, when it is considered that the current load in all of the sleep states, while different from each other are all in a region of FIG. 3B which is substantially optimal and below the minimum practical value of $V_{bus}$, that the preferred arrangement provides a substantially optimal positioning of $V_{bus}$ for all loads except for the extremely brief periods of low current load in the C0 state and the similarly short periods of high current load outside the C0 state.

Figure 10A:
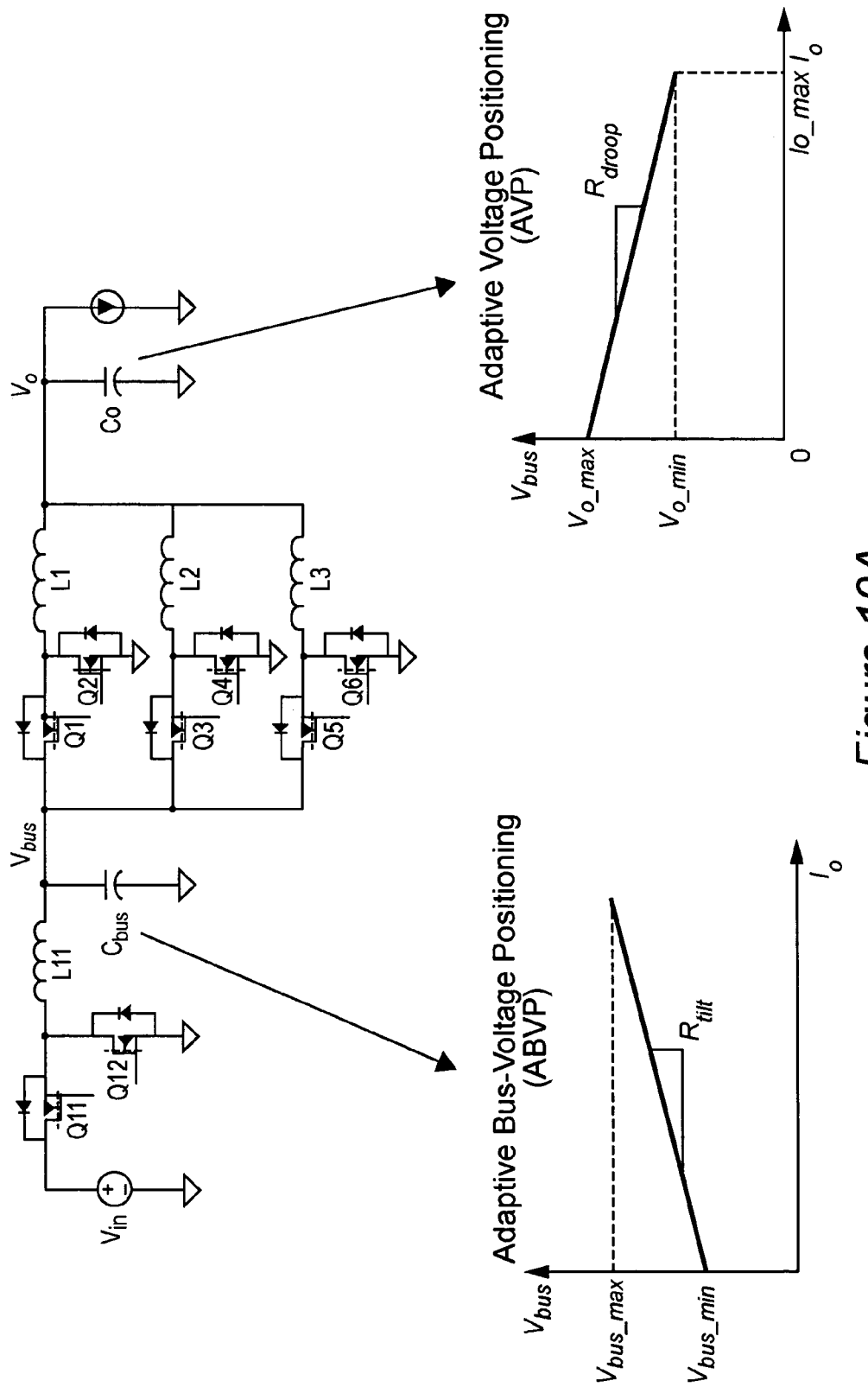
FIG. 10 is a diagram useful in understanding a perfecting feature of the invention in providing adaptive $V_{bus}$ and Vo positioning, FIG. 11 schematically illustrates a preferred arrangement for providing adaptive $V_{bus}$ and Vo positioning by current injection.
Figure 10B:
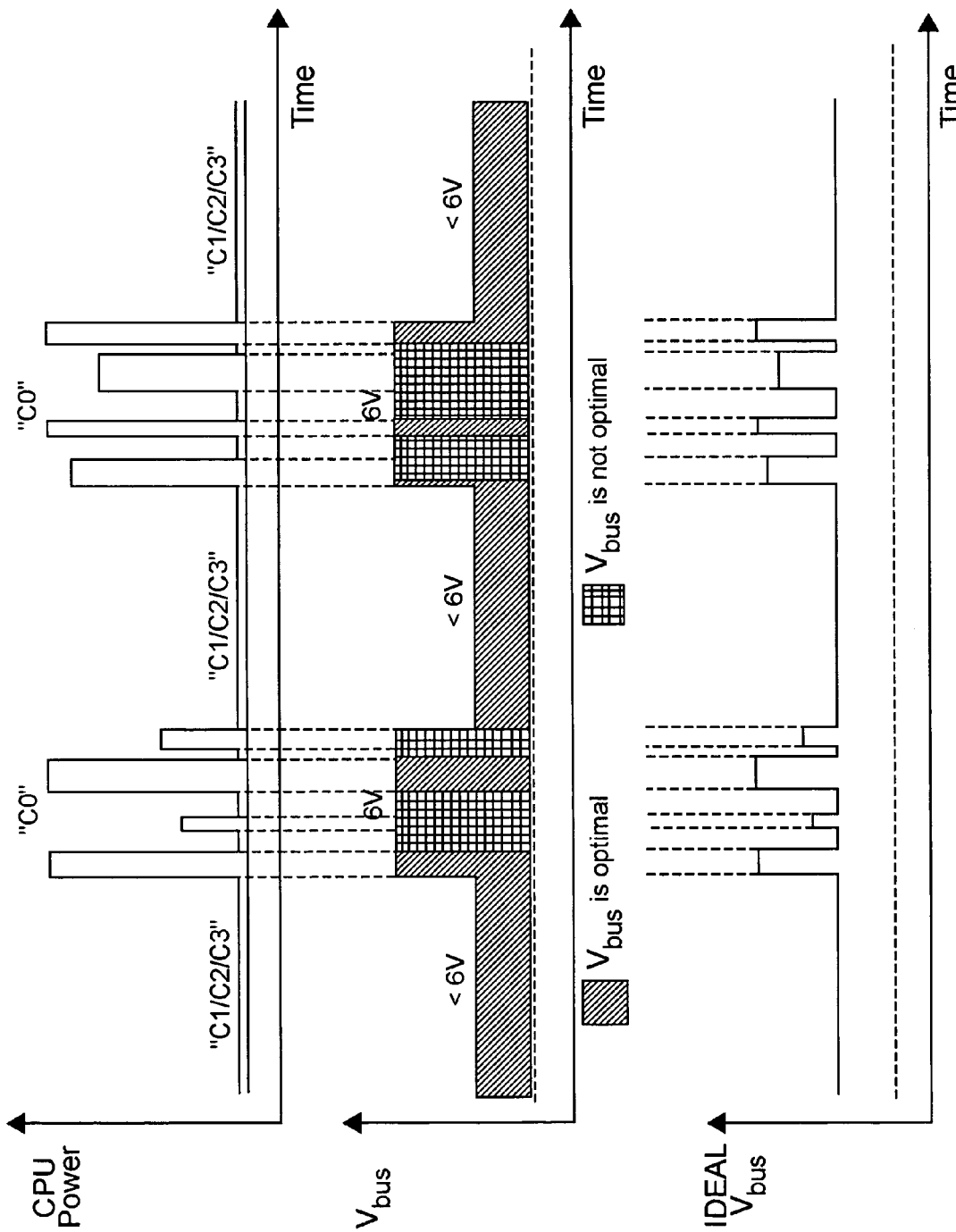

In seeking to address the variation in Vo which may occur during such short transient periods which are the only periods in which the preferred basic embodiment of the invention does not optimally position $V_{bus}$, it is ideally desired to make the positioning of $V_{bus}$ adaptively adjustable to the actual instantaneous current load. These changes are graphically depicted in FIGS. 10A and 10B, the latter of which is essentially a detail of FIG. 1 and particularly indicating periods of less than maximum current load during C0 state periods when the positioning of $V_{bus}$ at one of two nominal discrete voltages is not ideal. To be ideal, the $V_{bus}$ voltage would be required to assume some additional voltage levels, as shown in FIG. 10B. Further, differences in the load may induce changes in Vo as shown in FIG. 10A. For example, as shown in FIG. 10A, if there is a transient increase in current load while $V_{bus}$ is low, Vo will slightly decrease or droop. Conversely, during periods of reduced current load while $V_{bus}$ is high, Vo will slightly increase. The voltage droop may even be specified by CPU manufacturers to regulate power dissipation at high loads. It should also be recognized, as shown in FIG. 10B, that intermediate levels of current load may be presented between maximum load presented during the C0 state during which droop will (or must)occur to some degree and also between the various respective sleep states C1–Cn during which droop is slight or should be avoided.

Accordingly, as a perfecting feature of the invention, it is proposed to provide a voltage tilt in $V_{bus}$ to adjust otherwise discrete voltage levels to even more precisely optimize $V_{bus}$. It should be noted that the tilt and droop functions illustrated in FIG. 10A are substantially linear functions of voltage variation with current and can thus be characterized as resistances, $R_{tilt}$ and $R_{droop}$. Further, as a matter of terminology and to emphasize the respective functions of the basic invention described above with reference to FIGS. 1–9 which provides selected, discrete levels of $V_{bus}$ voltage depending on load operational state and referred to as "adaptive voltage positioning" (AVP), the perfecting feature to be described below with reference to FIGS. 10–12 is referred to as "adaptive bus voltage positioning" (ABVP) in which adjustments are made in both the first and second regulator stages to provide alteration of Vo with transient load current changes as may be required as well as to more fully optimize efficiency of the voltage regulator by providing a $V_{bus}$ voltage even more accurately matched to the actual load.

Figure 11:
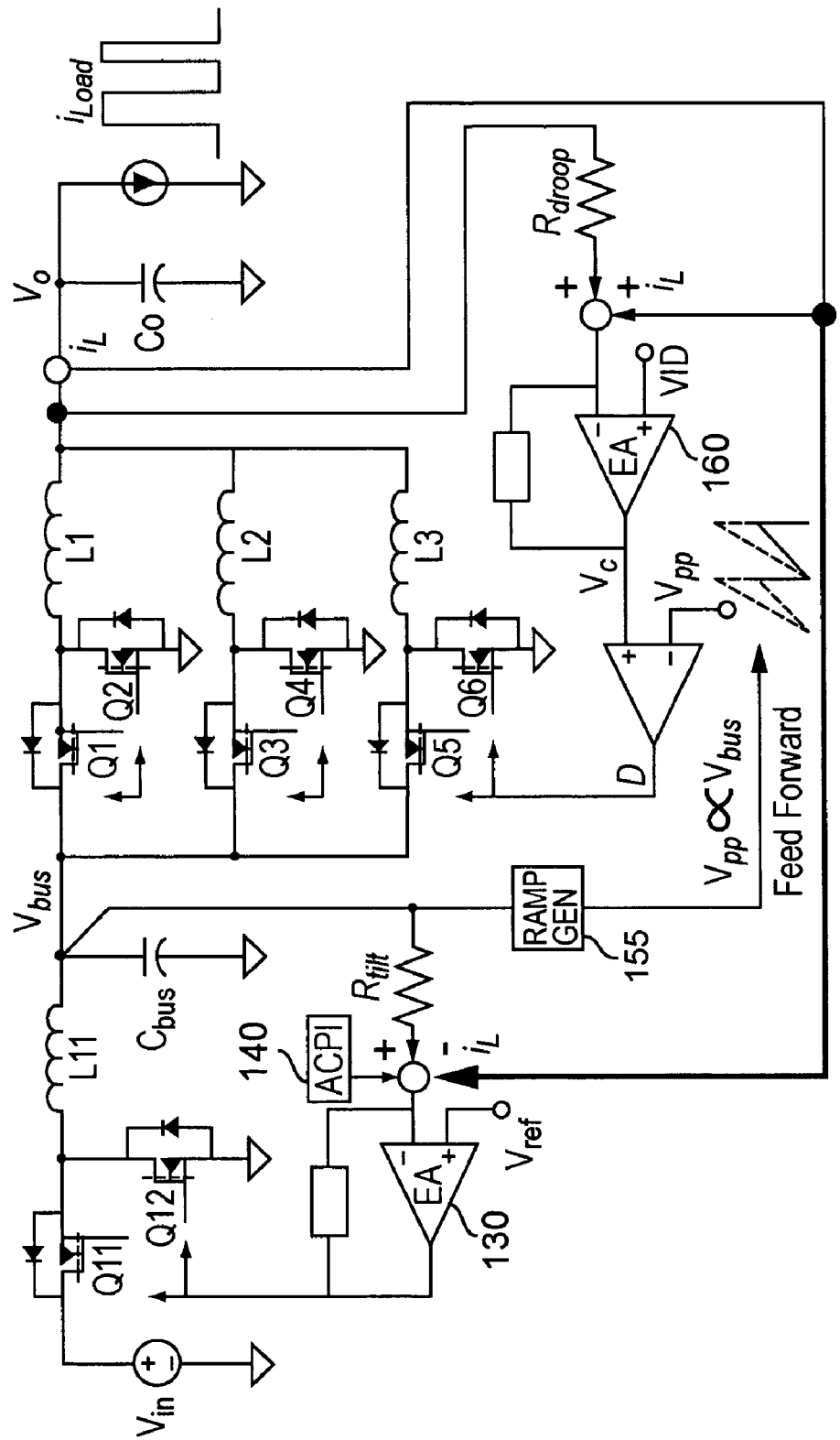
Figure 12:
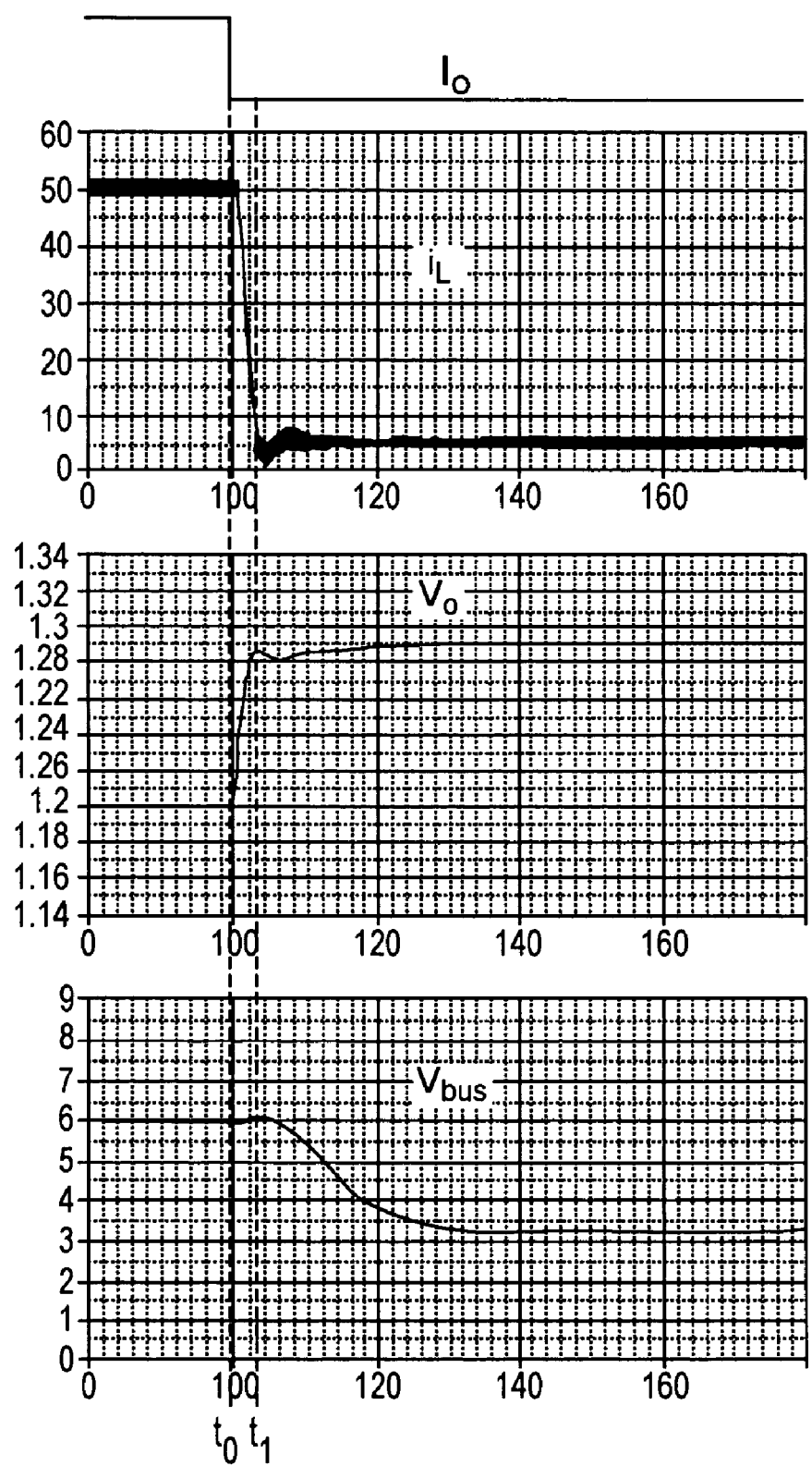
FIG. 12 illustrates design principles of the preferred arrangement for providing adaptive $V_{bus}$ and Vo positioning of FIG. 11.

This is preferably accomplished in accordance with the circuit shown in FIG. 11. In the first stage of this circuit, a reference voltage or other signal from the ACPI is coupled to a positive mixing node of a voltage comparator 130 to adaptively alter $V_{bus}$ based on operating state while $V_{bus}$ is fed back to the negative mixing node to control switching of Q11 and Q22 to obtain the desired $V_{bus}$ voltage, generally as described above. However, in this perfecting feature of the invention, the feedback of the $V_{bus}$ voltage includes a resistor, $R_{tilt}$. Since, as generally shown in FIG. 2, the optimum $V_{bus}$ value shifts substantially linearly with load current, the value of $R_{tilt}$ can be determined directly from the maximum current load and the maximum and minimum practical $V_{bus}$ values. In the second stage of the circuit both the output voltage Vo and current Io are sensed and applied to positive mixing nodes of a voltage comparator 160. The sensed voltage is attenuated by a resistor having a value, $R_{droop}$, proportional to the slope of the permitted or required voltage droop with change of output current Io and mixed with a signal representing the output current. The resulting (mixed) voltage signal is compared with a reference voltage VID (an internal digital voltage specification provided by the processor). A feedback arrangement including this Vo and Io information may be required by the particular CPU or other load powered by Vo and is generally provided in the voltage regulator. The output of voltage comparator 160 is used to adjust the reference value Vc discussed above in connection with the feed forward solution to the Vo anomaly when $V_{bus}$ is changed in accordance with the invention as discussed above.

In accordance with this form of the first embodiment of the invention, the current measurement used for the second stage feedback is also fed back to the first stage and applied to a mixing node of voltage comparator 130 to adjust the switching of Q11 and Q12 to adjust $V_{bus}$. In this regard, some switching, as will be evident to those skilled in the art (e.g. from a negative mixing node to a positive mixing node), may be required to avoid producing voltage droop at low current loads when $V_{bus}$ is low. Thus the load current information, $i_L$, usually already available in the second (or single) stage of a voltage regulator, is injected into the feedback loop of the first stage to adaptively adjust the present $V_{bus}$ level in accordance with the first embodiment of the invention or provide the entire $V_{bus}$ positioning function in accordance with a scond embodiment of the invention while the feed forward arrangement is still advantageously used by adaptive bus voltage positioning (ABVP).

As alluded to above, it is not only possible but preferred for simplicity in accordance with a second embodiment of the invention to provide the entire $V_{bus}$ positioning function based on the current feedback information $i_L$ and omitting the operating state information 140. This second embodiment has the additional advantage that switching transients due to the lower control bandwidth of the first stage may be less severe and the number of information paths in the feedback arrangement to the first stage is reduced and feedback control design simplified but may be limited in regard to precision of synchronization with the operational state since changes in the actual load cannot be measured in advance although any limitation in this regard is likely to be slight. In this case, $i_L$ is simply fed back to the negative mixing node for the negative input of voltage comparator 130 to provide continuous adjustment over the entire practical range for positioning of $V_{bus}$.

The design principles of the ABVP-AVP system of FIG. 11, illustrating both the first embodiment of the invention with the perfecting feature described above or the second embodiment of the invention in which the $V_{bus}$ positioning function is based on the actual current load are illustrated in FIG. 12 which graphically illustrates simulated performance of a voltage regulator in accordance with the second embodiment of the invention for a negative-going change in load current at time $t_0$. (Similar data would be expected for the first embodiment with the perfecting feature described above.) A similar but opposite response occurs for a positive-going change in load current. During the period from $t_0$ to $t_1$, corresponding to the finite rise or fall time of the load current information, $i_L$, there is little change in $V_{bus}$ and Vo responds to the Io change (with voltage regulation performance enhanced by feedback in the high-frequency response second stage of current load information, $i_L$, determined by the second stage control loop as $i_L$ changes). Therefore, it is clear that the second stage can be designed independently of the first stage and the two-stage arrangement providing optimal $V_{bus}$ in the first stage can be used in any voltage regulator design. After $t_1$, when $i_L$ becomes effective to adjust $V_{bus}$, Vo and $i_L$ are immune to $V_{bus}$ variation and the first stage design follows voltage-mode control design as described above which provides an optimum discrete $V_{bus}$ voltage level for optimum voltage regulator efficiency responsive to the operational state of the load which can be further adjusted, preferably over a continuous range of voltages which may exceed the range of $V_{bus}$ voltages provided by the basic invention, based on actual measured Io. Thus, in accordance with the first embodiment of the invention, large changes in load can be accommodated in a manner closely synchronized with the actual load by switching the coarse value of $V_{bus}$ based on prior knowledge of the operating state while smaller changes in load (or the entire change in load in accordance with the second embodiment of the invention) may be accommodated rapidly by feedback of actual current load information and with minimization of transients due to voltage regulator switching or analog transient response and, in both embodiments, increased efficiency by closer matching of $V_{bus}$ to the actual current loads particularly for very large and very small (e.g. sleep state) loads and variations in load during working mode or a sleep state.

Figure 13:
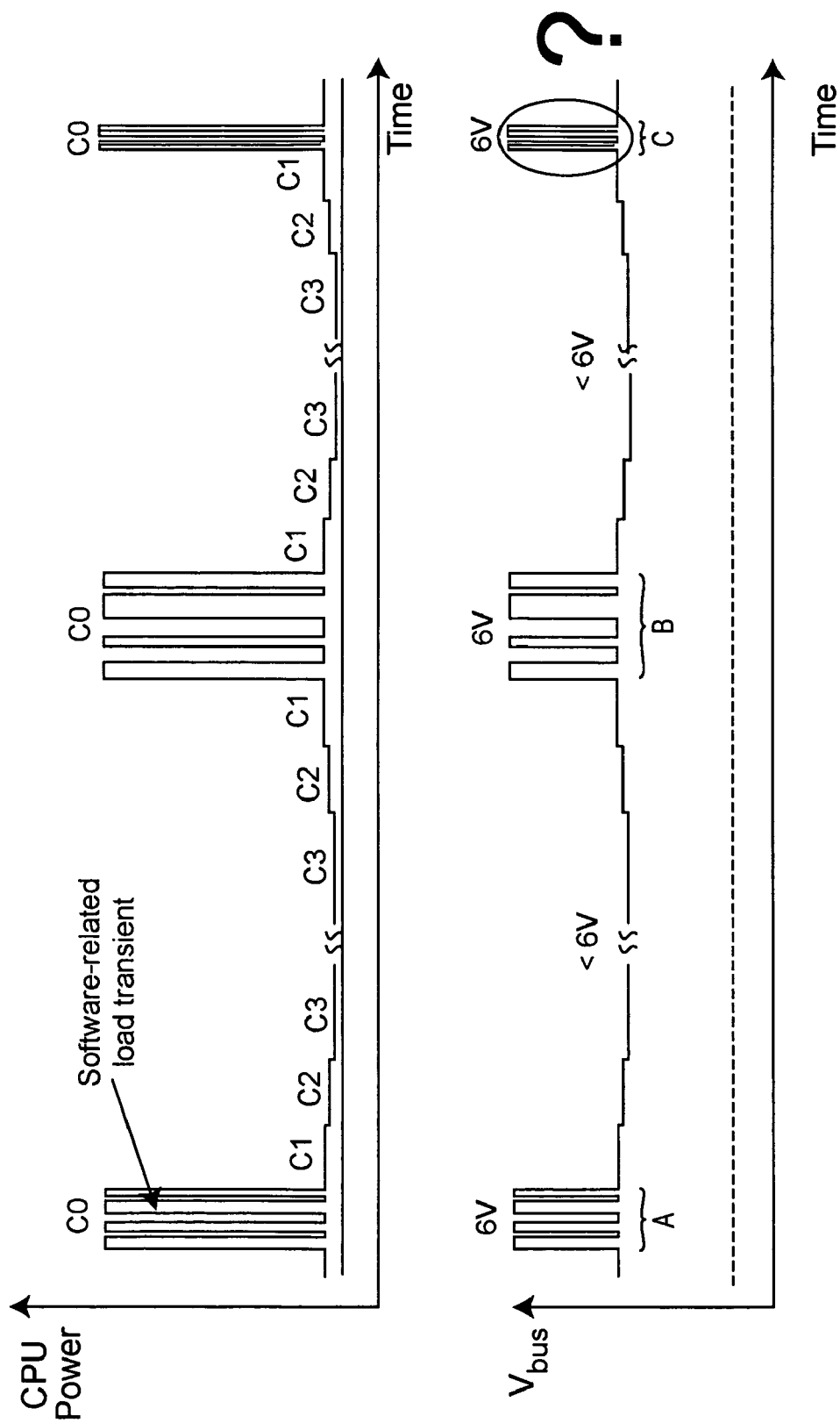
FIG. 13 illustrates possible variation of load transients in a CPU of a laptop computer, FIGS. 14 A, 14B, 14C and 14D illustrate simulated power supply response of a power supply in accordance with the invention to different recurrence frequencies of load transients.

As noted above, $V_{bus}$ cannot respond to high frequency load transients (e.g. in the MHz range. FIG. 13 illustrates that, using ABVP, the first stage is able to provide varying levels of $V_{bus}$ which track all of the CPU operating states C0–Cn including the C0–C1 transients in C0 states and the efficiency of the voltage regulator in accordance with the invention is optimal, even for transients within the C0 state as long as the recurrence frequency is below the MHz range (e.g. C0 transient groups A and B). The ability of the first stage to provide a range of voltages using ABVP in accordance with the perfecting feature in the first embodiment of the invention or using the second embodiment of the invention also provides optimal efficiency at high recurrence frequency of transients and near-optimal efficiency at intermediate frequency as will now be discussed in connection with FIGS. 14A–14D.

Figure 14A:
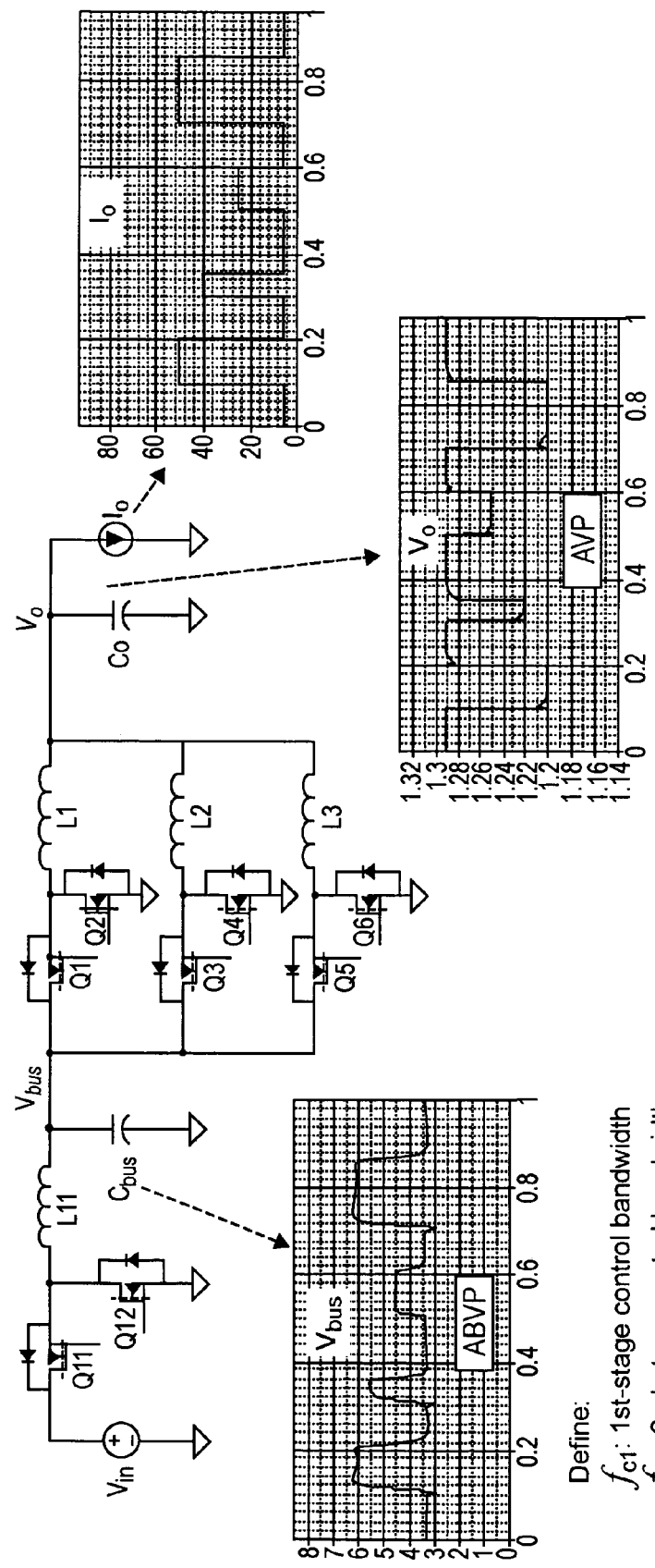
Figure 14B:
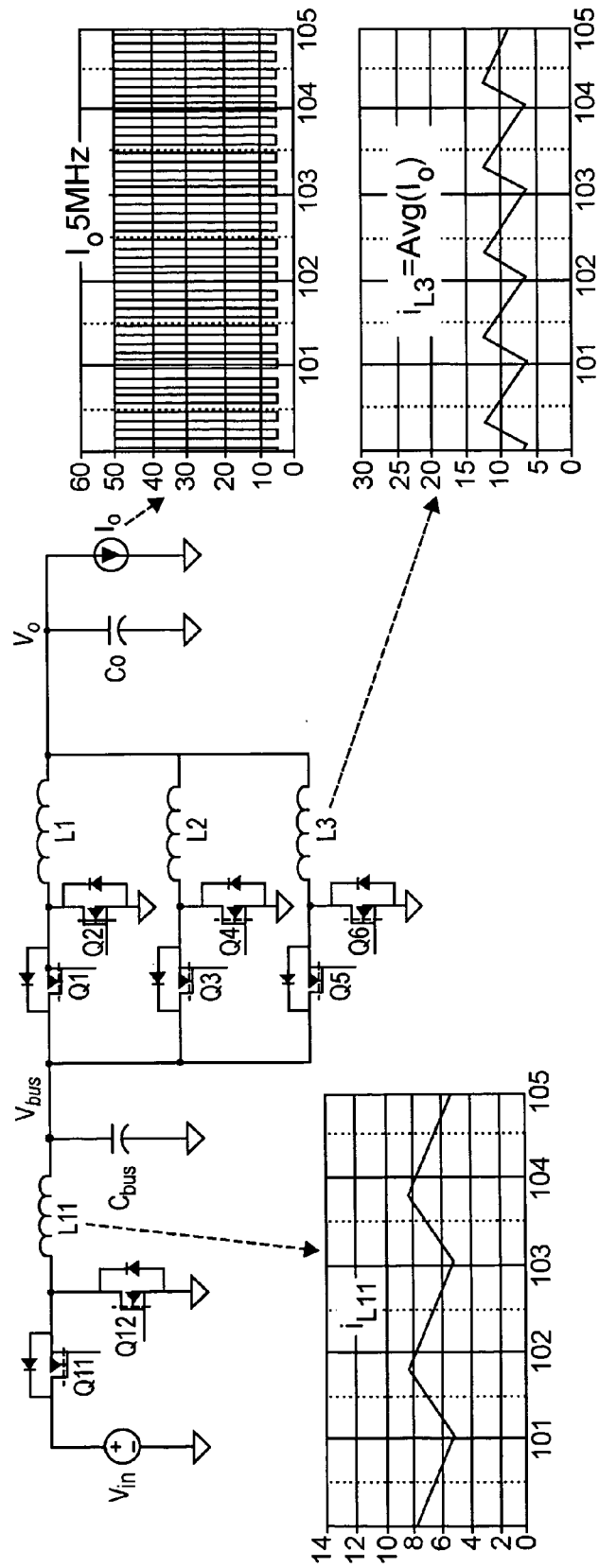
Figure 14C:
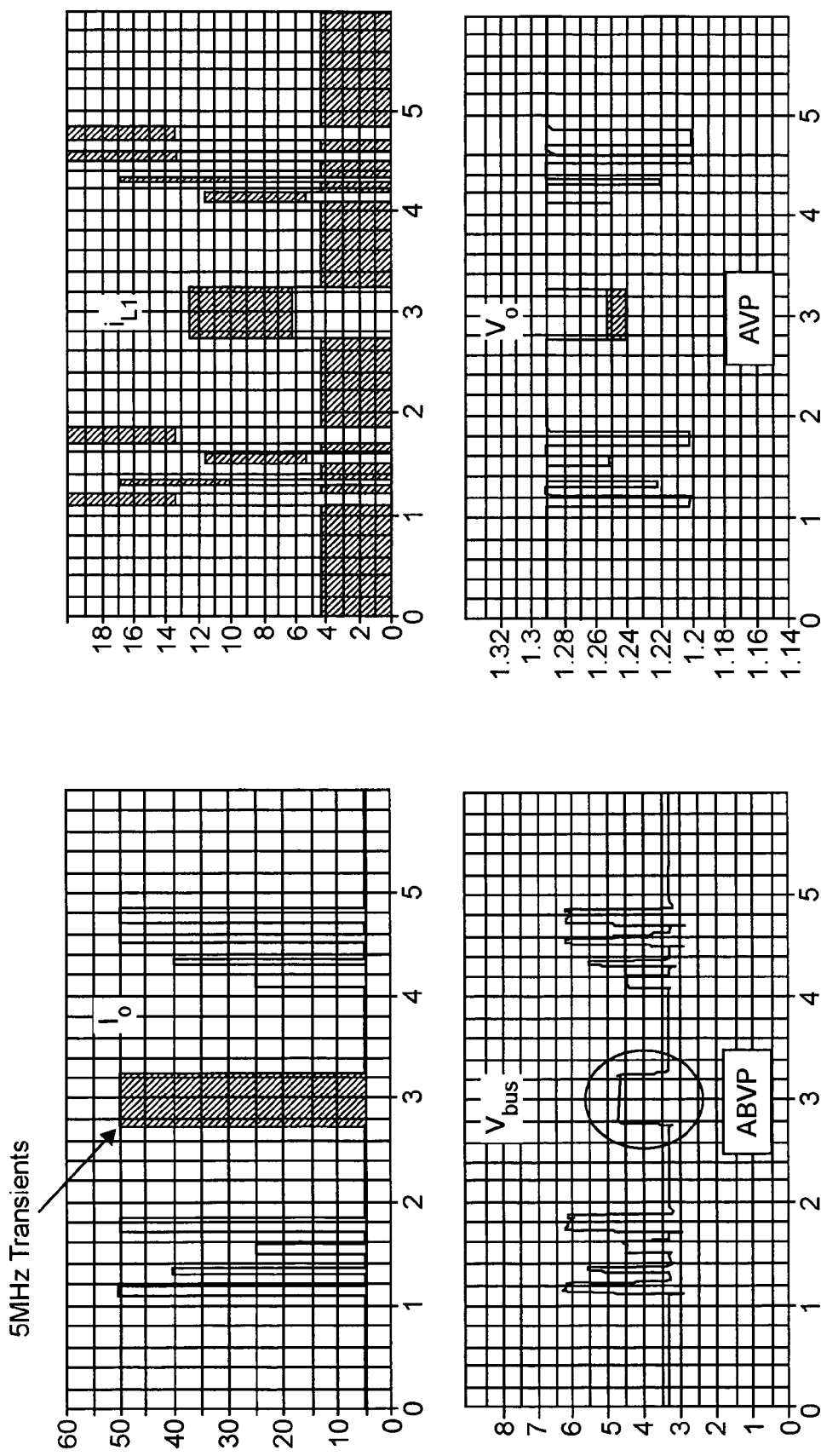
Figure 14D:
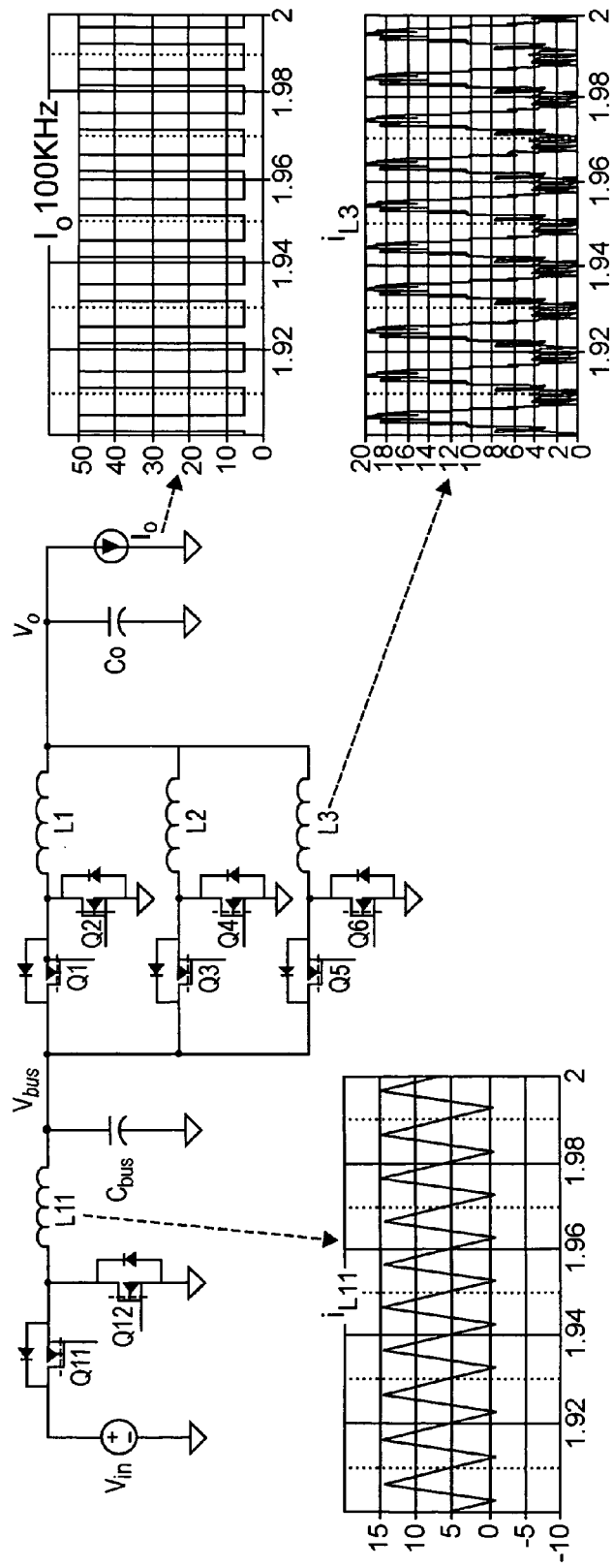
Figure 15:
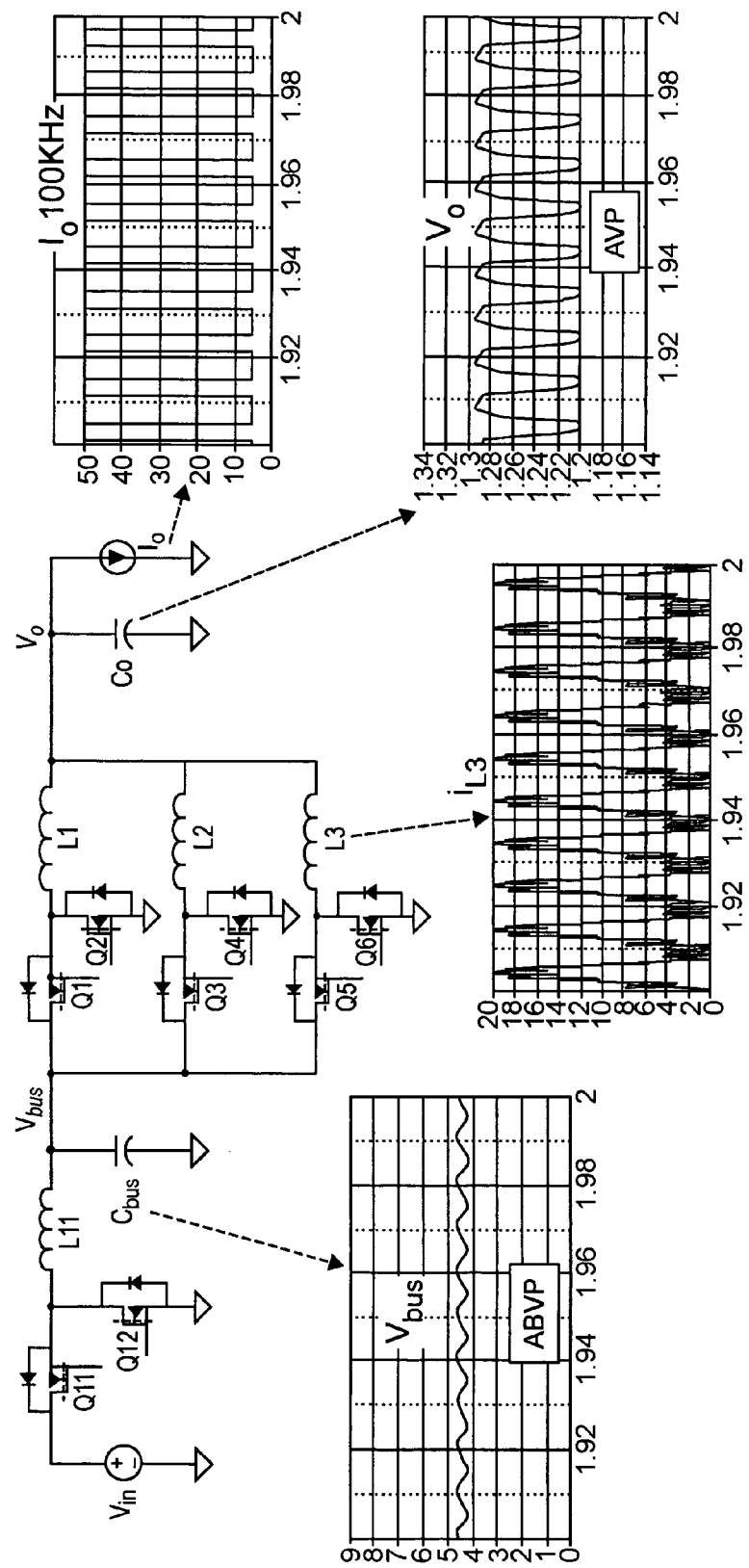
FIG. 15 illustrates the high power supply efficiency provided by the invention under mid-frequency power transient recurrence conditions.

FIG. 14A shows the AVP and ABVP response to varying current loads at low recurrence frequency below the first stage control bandwidth. It can be readily seen that $V_{bus}$ closely tracks variations in Io and regulation of Vo is good (e.g. within 0.09 volts, as shown). Both stages see the instantaneous Io and optimal $V_{bus}$ is determined as discussed above. FIG. 14B illustrates response of the voltage regulator in accordance with the invention with a load transient recurrence frequency above the second stage control bandwidth. In this case, both the first and second stages only see the average value of Io and the optimal value of $V_{bus}$ is determined accordingly based on the average load current; variations in which are shorter than the current ripple in the inductors of both the first and second stages and thus an optimal $V_{bus}$ voltage, in fact, corresponds to the average load current and transients are handled by the output filter capacitor Co, as illustrated in FIG. 14C. However, as shown in FIG. 14D, if the recurrence frequency of the load transients is between the control bandwidths of the first and second stages, the second stage sees the instantaneous Io transients while the first stage sees only the average Io. Thus, there will be increased current ripple in the inductors of both the first and second regulator stages. However, as shown in FIG. 15, the loss of efficiency is small while good voltage regulation is maintained. Specifically, the variation in Vo remains in the same range as in FIG. 14A (including droop, as may be required) while $V_{bus}$ will exhibit a small ripple around an average value determined by the duty cycle of the current load transients. Since the loss of efficiency corresponds to the variation in $V_{bus}$ from it optimal value, the variance of efficiency from its optimal level will generally be reduced by the size of the ripple in $V_{bus}$ as it follows the instantaneous average of Io and thus is much more closely matched to the optimum $V_{bus}$ value than has previously been possible, regardless of the design point chosen for a fixed $V_{bus}$ value.

In view of the foregoing, it is readily seen that the invention provides a voltage regulator which is capable of high-quality regulation over an extremely wide range of current loads while maintaining optimal efficiency under all load and transient conditions except for transient recurrence frequencies between the control bandwidths of the first and final stages which generally will be generally encountered only rarely and/or for only brief periods of time at extremely low duty cycles. The voltage regulator in accordance with the invention is particularly well-suited to and highly compatible with sophisticated power saving arrangements, particularly where very large and very small loads are presented for the predominant amount of time during use where prior voltage regulators have presented conflicting design criteria and exhibited substantial and previously unavoidable inefficiency. Embodiments of the invention suitable for use with CPUs in laptop computers and the like are of particularly simple configuration and can be fabricated at small size and light weight. Power dissipation requirements are thus reduced and usable battery life can be significantly extended.

While the invention has been described in terms of two preferred embodiments and a perfecting feature for the first embodiment, those skilled in the art will recognize that the invention can be practiced with modification within the spirit and scope of the appended claims.

The invention claimed is:

1. A voltage regulator for an electrical device having a plurality of operating modes having differing current consumption, said voltage regulator comprising
   a regulator stage having an input for receiving an input voltage, and
   a $V_{bus}$ supply regulator stage having an input for receiving information corresponding to an operational mode of said electrical device and supplying a voltage corresponding to said operational mode or said current consumption as said input voltage to said regulator stage such that said input voltage is larger for higher steady state current consumption and lower for lower steady state current consumption.

2. A voltage regulator as recited in claim 1, wherein said electrical device exhibits a working mode and a sleep mode and said $V_{bus}$ supply regulator stage supplies a first voltage corresponding to said working mode and a different voltage corresponding to said sleep mode.

3. A voltage regulator as recited in claim 2, wherein said electrical device is a CPU and said regulator stage supplies a varying voltage corresponding to current required by said CPU.

4. A voltage regulator as recited in claim 1, wherein said $V_{bus}$ supply regulator stage provides one of two discrete voltages.

5. A voltage regulator as recited in claim 1, further comprising
   a ramp generator for generating a ramp waveform having an amplitude corresponding to said input voltage for control of said regulator stage.

6. A voltage regulator as recited in claim 1, further including
   a feedback loop in said $V_{bus}$ supply regulator stage.

7. A voltage regulator as recited in claim 6, wherein said feedback loop includes an $R_{tilt}$ resistor.

8. A voltage regulator as recited in claim 6, further including
   a feedback loop in said regulator stage including signal paths for signals corresponding to output voltage and output current of said voltage regulator, respectively.

9. A voltage regulator as recited in claim 8, wherein said signal path for said signal corresponding to output voltage includes an $R_{droop}$ resistor.

10. A voltage regulator as recited in claim 8, further including
    a connection for supplying said signal corresponding to said output current to said feedback loop of said $V_{bus}$ supply regulator stage for making an adjustment to said input voltage.

11. A voltage regulator as recited in claim 10, wherein said adjustment to said voltage provides a continuous range of voltages.

12. A voltage regulator as recited in claim 11, wherein said regulator stage comprises a plurality of parallel voltage regulator circuits.

13. A voltage regulator as recited in claim 12 wherein operation of selected ones of said parallel voltage regulator circuits may be discontinued in response to current load requirements.

14. An electrical device comprising
    a load having a plurality of operating modes having differing current consumption, and
    a voltage regulator, said voltage regulator including
      a regulator stage having an input for receiving an input voltage, and
      a $V_{bus}$ supply regulator stage having an input for receiving information corresponding to an operational mode or current consumption of said electrical device and supplying a voltage corresponding to said operational mode or current consumption as said input voltage to said voltage regulator stage such that said input voltage is larger for higher steady state current consumption and lower for lower steady state current consumption.

15. An electrical device as recited in claim 14, further including
    a feedback loop in said $V_{bus}$ supply regulator stage.

16. An electrical device as recited in claim 15, wherein said feedback loop includes an $R_{tilt}$ resistor.

17. An electrical device as recited in claim 15, further including
    a feedback loop in said regulator stage including signal paths for signals corresponding to output voltage and output current of said voltage regulator, respectively.

18. An electrical device as recited in claim 17, wherein said signal path for said signal corresponding to output voltage includes an $R_{droop}$ resistor.

19. An electrical device as recited in claim 17, further including
    a connection for supplying said signal corresponding to said output current to said feedback loop of said $V_{bus}$ supply regulator stage for making an adjustment to a said voltage.

20. An electrical device as recited in claim 19, wherein said adjustment to said voltage provides a continuous range of voltages.

* * * * *